(12) United States Patent
Lee et al.

(10) Patent No.: US 11,318,789 B2
(45) Date of Patent: May 3, 2022

(54) ULTRASONIC WELDING TYPE WHEEL RESONATOR

(71) Applicants:HYUNDAI MOTOR COMPANY, Seoul (KR); KIA MOTORS CORPORATION, Seoul (KR); HANDS CORPORATION LTD., Incheon (KR)

(72) Inventors: Joong-Wook Lee, Seoul (KR); Jong-Wook Lee, Seoul (KR); Tae-Soo Chi, Seoul (KR); Eun-Sang Ryu, Seoul (KR); Nam-Young Kim, Seoul (KR); Suk-Jin Ko, Seoul (KR); Hyun-Soo Kim, Seoul (KR); Keon-Ki Han, Seoul (KR); Kyoung-Duck Shin, Seoul (KR); In-Bum Hwang, Seoul (KR)

(73) Assignees: HYUNDAI MOTOR COMPANY, Seoul (KR); KIA MOTORS CORPORATION, Seoul (KR); HANDS CORPORATION LTD., Incheon (KR)

(*) Notice: Subject to any disclaimer, the term of this patent is extended or adjusted under 35 U.S.C. 154(b) by 124 days.

(21) Appl. No.: 16/007,398

(22) Filed: Jun. 13, 2018

(65) Prior Publication Data

US 2019/0016279 A1 Jan. 17, 2019

(30) Foreign Application Priority Data

Jul. 12, 2017 (KR) ........................ 10-2017-0088471

(51) Int. Cl.
*B60C 5/20* (2006.01)
*B60C 19/00* (2006.01)
(Continued)

(52) U.S. Cl.
CPC ................ *B60C 5/20* (2013.01); *B23K 20/10* (2013.01); *B60B 17/0017* (2013.01);
(Continued)

(58) Field of Classification Search
CPC ......... B60C 17/00; B60C 17/01; B60C 17/02; B60C 17/04; B60C 17/041; B60C 19/002;
(Continued)

(56) References Cited

U.S. PATENT DOCUMENTS

| 7,325,581 | B2 | 2/2008 | Braun |
| 2013/0225002 | A1 | 8/2013 | Golob et al. |
| 2017/0120673 | A1 | 5/2017 | Kamiyama |

FOREIGN PATENT DOCUMENTS

| DE | 102016102846 A1 | | 9/2016 |
| GB | 2536034 | * | 9/2016 |

(Continued)

OTHER PUBLICATIONS

Machine translation of JP 6-106903, 1994.*

*Primary Examiner* — Justin R Fischer
(74) *Attorney, Agent, or Firm* — Morgan, Lewis & Bockius LLP

(57) ABSTRACT

A wheel resonator for reducing a resonance phenomenon inside a tire of a vehicle may include a plurality of wheel resonators mounted to a tire wheel. First and second wheel resonators of the plurality of wheel resonators are fixed with each other by a fastening part including a protrusion disposed on an end of the first wheel resonator penetrating through a hole disposed in an end of the second wheel resonator. An end portion of the protrusion has a size greater than a size of the hole. As such, quality of a wheel through more reliable noise reduction by making a wheel resonator in a manner of forming a fitting type fastening part in the
(Continued)

wheel resonator itself and fixing the wheel resonator by ultrasonic welding can be improved.

13 Claims, 4 Drawing Sheets

(51) Int. Cl.
    *B60B 21/12*     (2006.01)
    *B23K 20/10*     (2006.01)
    *B60B 17/00*     (2006.01)
    *B60R 13/08*     (2006.01)
    *B23K 101/00*     (2006.01)

(52) U.S. Cl.
    CPC ............ *B60B 21/12* (2013.01); *B60C 19/002* (2013.01); *B23K 2101/006* (2018.08); *B60B 2900/133* (2013.01); *B60R 13/0884* (2013.01)

(58) Field of Classification Search
    CPC .... B60C 5/02; B60C 5/20; B60C 5/24; B60C 5/22
    See application file for complete search history.

(56) References Cited

FOREIGN PATENT DOCUMENTS

| | | | |
|---|---|---|---|
| JP | 6-106903 | * | 4/1994 |
| JP | 11-115671 | A | 4/1999 |
| JP | 2006-298231 | A | 11/2006 |
| JP | 2008-030505 | A | 2/2008 |
| JP | 2008-201157 | A | 9/2008 |
| JP | 2013-542877 | A | 11/2013 |
| KR | 10-2010-0062708 | A | 6/2010 |
| KR | 10-1369312 | B1 | 3/2014 |
| KR | 10-1448031 | B1 | 10/2014 |
| KR | 10-1475218 | B1 | 12/2014 |
| KR | 10-2015-0003436 | A | 1/2015 |

* cited by examiner

[FIG. 1]
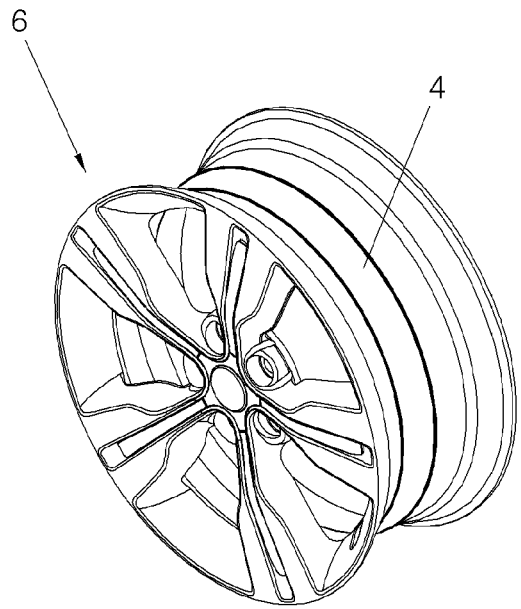
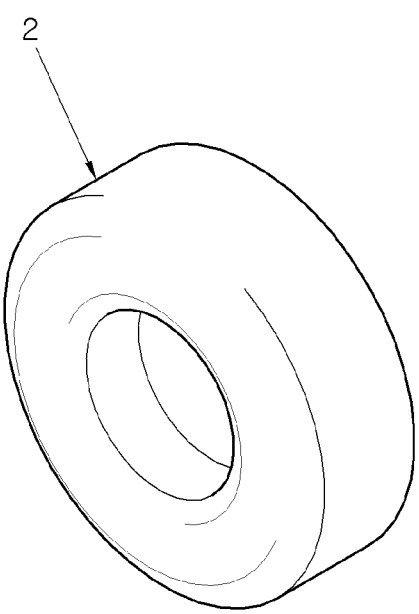
Prior Art

[FIG. 3]
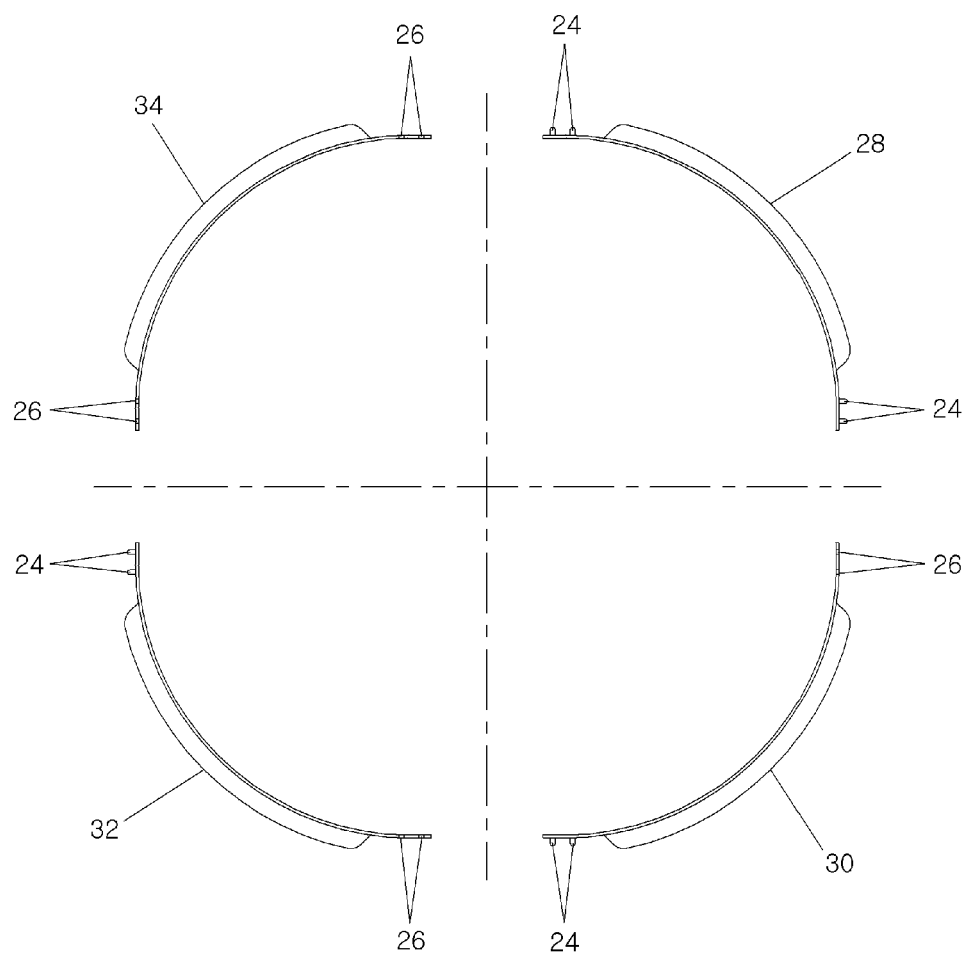

[FIG. 4]
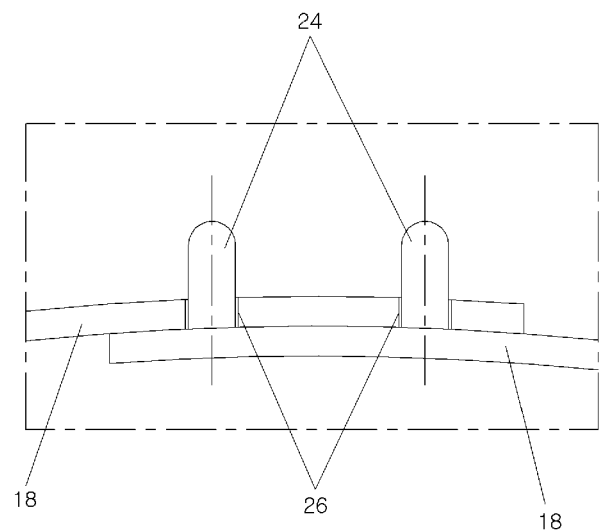
[FIG. 5]
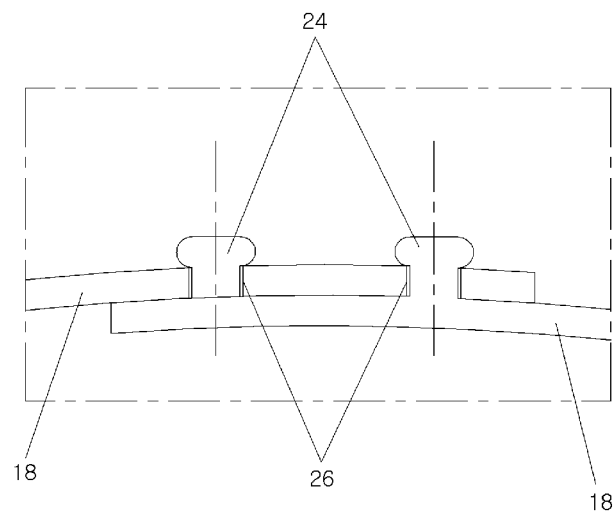

ULTRASONIC WELDING TYPE WHEEL RESONATOR

CROSS-REFERENCE(S) TO RELATED APPLICATIONS

This application claims priority to Korean Patent Application No. 10-2017-0088471, filed on Jul. 12, 2017, the disclosure of which is incorporated herein by reference in its entirety.

TECHNICAL FIELD

The present disclosure relates to an ultrasonic welding type wheel resonator, and more particularly, to an ultrasonic welding type wheel resonator with a fitting type fastening part formed on the wheel resonator fixed by ultrasonic welding.

BACKGROUND

In general, as shown in FIG. 1, an automobile tire 2 serves to elastically support a vehicle body by being mounted to a wheel 6 in a manner of to allow an inner circumferential surface of the tire 2 to be coupled onto a rim 4 formed on the wheel 6 and then being filled with air.

Since the tire 2 continuously undergoes friction with the road surface during traveling of a vehicle, noise inevitably generated inside the tire 2 may reflect between the inner surface of the tire and the rim 4, causing a resonance phenomenon.

As a result of such noise phenomenon, noise having a sharp peak is transmitted into the inside of an occupant compartment of the vehicle, which causes a driver to feel uncomfortable. In addition, ride quality is deteriorated due to continuous noise.

SUMMARY

The present disclosure has been made in effort to solve the problems as described above. An object of the present disclosure is to achieve improvement of quality of a wheel through more reliable noise reduction by making a wheel resonator in a manner of forming a fitting type fastening part in the wheel resonator itself and fixing the wheel resonator by ultrasonic welding unlike a conventional method of fixing the wheel resonator by welding.

It is also an object of the present disclosure to reduce cost by fastening the wheel resonator without any additional processing such as welding.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a wheel resonator for reducing a resonance phenomenon inside a tire of a vehicle includes a plurality of wheel resonators mounted to a tire wheel. First and second wheel resonators of the plurality of wheel resonators are fixed with each other by a fastening part including a protrusion disposed on an end of the first wheel resonator penetrating through a hole disposed in an end of the second wheel resonator. An end portion of the protrusion has a size greater than a size of the hole.

Each of opposite ends of each of the plurality of wheel resonators includes a hole or a protrusion of the fastening part.

The second wheel resonator includes another hole disposed in another end of the second wheel resonator.

Among the plurality of wheel resonators, the second wheel resonator is the only wheel resonator which has holes disposed in the both ends.

The first wheel resonator includes another protrusion disposed on another end of the first wheel resonator.

Among the plurality of wheel resonators, the first wheel resonator is the only wheel resonator which has protrusions disposed on the both ends.

The first wheel resonator includes a hole disposed in another end of the first wheel resonator.

The second wheel resonator includes a protrusion disposed on another end of the second wheel resonator.

Among the plurality of wheel resonators mounted to the tire wheel, two or more wheel resonators each have a protrusion disposed on one end and a hole disposed in another end.

Each of the plurality of wheel resonators has an arc shape having a radius of curvature the same as that of an outer periphery of a rim portion of the tire wheel.

The plurality of wheel resonators are fastened to each other and form an annular structure wound around the rim portion of the tire wheel.

The fastening parts formed on either one side of the wheel resonator is provided as plural ones.

The wheel resonator has a flat tube structure having a resonance chamber with a predetermined internal volume.

In accordance with one aspect of the present disclosure, a method for mounting a plurality of wheel resonators on a rim of a tire wheel includes inserting a protrusion formed on an end of a first wheel resonator of the plurality of wheel resonators into a hole formed on an end of a second wheel resonator of the plurality of wheel resonators, and performing an ultrasonic welding to deform an end portion of the protrusion, such that the deformed end portion of the protrusion having a size greater than a size of the hole.

According to the present disclosure, since the fitting type fastening part is formed in the wheel resonator itself, coupling between the plurality of wheel resonators to be mounted to a rim portion of one tire wheel is facilitated. Further, since the plurality of wheel resonators are fixed by ultrasonic welding after being coupled, no further separate processing such as welding is required and thus, it is possible to reduce cost. Moreover, since more reliable noise reduction can be obtained, quality is improved.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 shows perspective views of an automobile tire and a wheel in the prior art;

FIG. 3 is an example view showing a manner of coupling wheel resonators according to the present disclosure;

FIG. 4 is an example view of a wheel resonator according to the present disclosure before ultrasonic welding; and FIG. 5 is an example view of a wheel resonator according to the present disclosure after ultrasonic welding.

DETAILED DESCRIPTION

Figure 2:
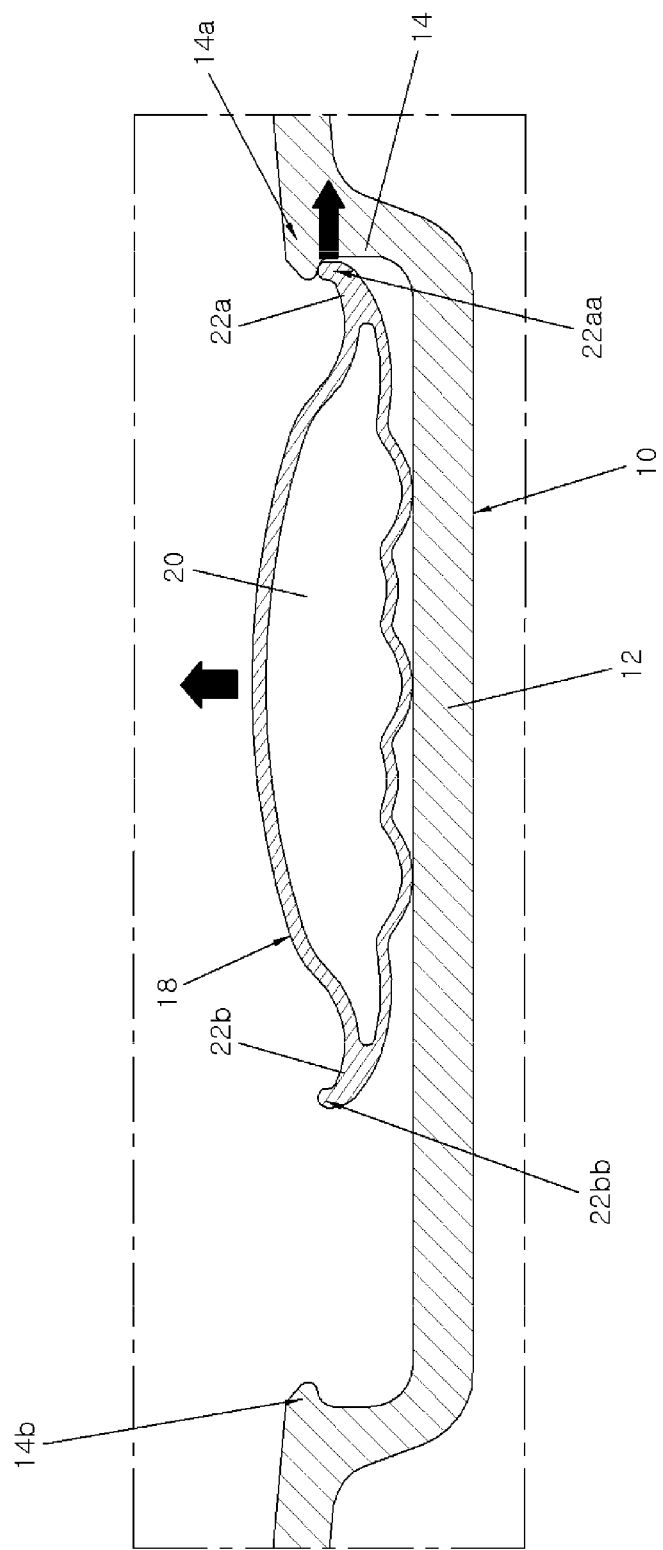
FIG. 2 is a cross sectional view of a wheel resonator mounted to a rim, according to the present disclosure.

For a better understanding of the present disclosure, preferred embodiments of the present disclosure will be described with reference to the accompanying drawings. It is to be understood that embodiments of the present disclosure can be modified in various forms and the scope of the present disclosure should not be construed as being limited to the embodiments described in detail below. The embodiments set forth herein are provided to enable those skilled in the art to more fully understand the present disclosure. Therefore, shapes and the like of elements in the drawings can be exaggerated in order to emphasize a clearer explanation. It should be noted that the identical components in the drawings may be denoted by the same reference numeral. In addition, detailed descriptions of functions and constructions well known in the art may be omitted in order to avoid unnecessarily obscuring the gist of the present disclosure.

The present disclosure relates to an ultrasonic welding type wheel resonator, and more particularly, to an ultrasonic welding type wheel resonator with a fitting type fastening part formed on the wheel resonator 18 fixed by ultrasonic welding.

FIG. 2 shows a cross sectional view of a wheel resonator mounted to a rim, according to the present disclosure, FIG. 3 shows an example view showing a manner of coupling wheel resonators according to the present disclosure, FIG. 4 shows an example view of a wheel resonator according to the present disclosure before ultrasonic welding, and FIG. 5 shows an example view of a wheel resonator according to the present invention after ultrasonic welding.

The wheel resonator 18 of the present disclosure has a flat tube structure having a closed resonance chamber 20 with a predetermined internal volume as shown in FIG. 2, and is formed between support portions 22a and 22b for allowing the wheel resonator to be assembled in a rim portion 12 of a tire wheel 10. A first support portion 22a of the wheel resonator 18 is assembled to a first flange portion 14a of the support wall 14 in the rim portion 12 by forcing a first hook portion 22aa of the first support portion 22a to be supported by the first flange portion 14a of the support wall 14, while a second support portion 22b having a second hook portion 22bb, opposite to the first support portion 22a supported by the first flange portion 14a of the support wall 14, is spaced apart from a second flange portion 14b of the support wall 14 in the rim portion 12 of the tire wheel 10.

The wheel resonator 18 has a width corresponding to a portion of the entire width of the rim portion 12 rather than a width corresponding to the entire width of the rim portion. A plurality of wheel resonators 18 are fixed with each other and then mounted to the rim portion 12, as described later.

A plurality of wheel resonators 18 are assembled at an equal interval along the rim portion 12 of the tire wheel to form an annular structure. Each of the plurality of wheel resonators 18 is formed in an arc shape having the radius of curvature as that of the outer periphery of the rim portion 12 of the tire wheel.

Fitting type fastening parts are formed on opposite ends of one wheel resonator 18 respectively in order to allow adjacent ones of the plurality of wheel resonators 18 to be coupled with each other and assembled at an equal intervals along the rim portion 12 of the tire wheel.

One resonator 18 of the plurality of wheel resonators and another adjacent resonator 18 abutting the one resonator 18 are fastened with each other by means of the fastening parts. The one wheel resonator 18 and the another wheel resonator 18 are fixed with each other by ultrasonic welding the fastening parts of them after the fastening parts fastened the one wheel resonator 18 and the another wheel resonator 18 with each other.

Although a configuration of the fastening parts and a method of fastening the fastening parts are not limited, the fastening parts in the present disclosure are formed in the form of a protrusion 24 and a hole 26 respectively. The protrusion 24 is inserted into the hole 26, thereby fastening any one of the plurality of wheel resonators 18 and another wheel resonator 18 adjacent to each other.

The protrusion 24 is configured to protrude toward the inside of the tire rather than toward the rim portion 12 of the tire wheel when the protrusion 24 and the hole 26 are coupled with each other.

Shapes of the respective fastening parts formed on each of the plurality of wheel resonators 18 mounted to the rim portion 12 of the tire wheel may be different from each other or identical with each other.

For example, shapes of the fastening parts formed on opposite ends of any one of the plurality of wheel resonators 18 and shapes of the fastening parts formed on opposite ends of another one of the plurality of wheel resonators 18 may be identical with each other or different from each other.

Further, both opposite ends of any one of the plurality of wheel resonators 18 are formed with holes 26 or otherwise protrusions 24. Alternatively, one end of the opposite ends is formed with protrusions 24, while the other end of the opposite ends is formed with holes 26.

Although the number of the wheel resonators 18 mounted to the rim portion 12 of the tire wheel is not limited, this embodiment of the present disclosure will be described with reference to an example in which four wheel resonators 18, represented by elements denoted by reference numerals 28, 30, 32, and 34, are mounted to the rim portion 12 of the tire wheel as shown in FIG. 3.

The rim portion 12 of the tire wheel is mounted with four wheel resonators 18 including a first wheel resonator 28, a second wheel resonator 30, a third wheel resonator 32, and a fourth wheel resonator 34.

Protrusions 24 are formed on both opposite ends of the first wheel resonator 28 to be assembled first when the plurality of wheel resonators 18 are assembled to the rim portion 12 of the tire wheel.

One end of the first wheel resonator 28 abuts against the second wheel resonator 30 and the other end of the first wheel resonator 28 abuts against the fourth wheel resonator 34.

One end of the second wheel resonator 30 assembled with the first wheel resonator 28 is formed with holes 26 and the other end with protrusions 24.

The protrusions 24 formed on the other end of the first wheel resonator 28 are inserted into the holes 26 formed on one end of the second wheel resonator 30 respectively so that the first wheel resonator 28 and the second wheel resonator 30 are fastened with each other.

One end of the third wheel resonator 32 assembled with the second wheel resonator 30 is formed with holes 26 and the other end with protrusions 24.

The protrusions 24 formed on the other end of the second wheel resonator 30 are inserted into the holes 26 formed on one end of the third wheel resonator 32 respectively so that the second wheel resonator 30 and the third wheel resonator 32 are fastened with each other.

Holes 26 are formed on both opposite ends of the fourth wheel resonator 34 assembled with the third wheel resonator 32.

The protrusions 24 formed on the other end of the third wheel resonator 32 are inserted into the holes 26 formed on one end of the fourth wheel resonator 34 respectively so that the third wheel resonator 32 and the fourth wheel resonator 34 are fastened with each other.

When fastening between the third wheel resonator 32 and the fourth wheel resonator 34 is completed, the protrusions 24 formed on one end of the first wheel resonator 28 are finally inserted respectively into the holes 26 formed on the other end of the fourth wheel resonator 34 so that the first wheel resonator 28 and the fourth wheel resonator 34 are fastened with each other, with the result that fastening between all the wheel resonators 18, represented by the elements denoted by reference numerals 28, 30, 32, and 34 in FIG. 3, are completed.

In this case, it is noted that among the plurality of wheel resonators 18, the wheel resonator 18 (e.g., the first wheel resonator 28) with protrusions 24 formed on both opposite ends must be assembled first in the rim portion 12 of the wheel tire while the wheel resonator 18 (e.g., the first wheel resonator 34) with holes 26 formed on both opposite ends must be finally assembled in the rim portion 12 of the wheel tire.

Therefore, in an example in which a plurality of wheel resonators 18 are assembled in a rim portion 12 of one tire wheel, the number of the wheel resonator 18 with holes 26 and protrusions 24 formed on one end and the other end respectively may be plural, whereas the number of the wheel resonator 18 with holes 26 formed on both opposite ends and the number of the wheel resonator 18 with protrusions 24 formed on both opposite ends may be one, respectively.

When fastening between the plurality of wheel resonators 18 as described above is completed, ultrasonic welding is applied to the fastening parts. As shown in FIGS. 4 and 5, when ultrasonic welding is applied to the fastening parts, the protrusions 24 are deformed to have a diameter larger than a diameter of the holes 26 so that the protrusions 24 are prevented from being broken away from the holes 26.

It is to be understood that when ultrasonic welding is applied to the protrusions 24, the protrusions 24 do not necessarily have to be deformed into a circular shape, but have to be deformed to a size that can completely cover the entire size of each of the holes 26 after being deformed.

The plurality of wheel resonators 18 mounted to the rim part 12 of one tire wheel are fastened with each other by the method as described above.

The number of the fastening part formed on either one of opposite of each of the wheel resonators 18 may be one, but the fastening part is preferably provided as plural ones.

That is, when the protrusion 24 to be formed on one end of one wheel resonator 18 of the plurality of wheel resonators is formed as plural ones, the number of the holes 26 to be formed on one end of the other wheel resonator 18 to be fastened with the one end of the one wheel resonator 18 is also identical with the number of the protrusions 24 to be formed on the one end of the one wheel resonator 18 such that coupling force between the wheel resonators 18 is increased.

According to the ultrasonic welding type wheel resonator 18 of the present disclosure, since the fitting type fastening part is formed in the wheel resonator 18 itself, coupling between the plurality of wheel resonators 18 to be mounted to the rim portion 12 of one tire wheel is facilitated. Further, since the plurality of wheel resonators are fixed by ultrasonic welding after being coupled, no further separate processing such as welding is required and thus, it is possible to reduce cost. Moreover, since more reliable noise reduction can be obtained, quality is improved.

The embodiments of the ultrasonic welding type wheel resonator of the present disclosure as described above are merely illustrative and those skilled in the art will appreciate clearly that various modifications and equivalent embodiments can be made without departing from the scope of the present disclosure. Therefore, it is to be understood that the present invention is not limited only to the form set forth in the foregoing description. Accordingly, the true scope of the present disclosure should be defined by the technical spirit of the appended claims. It is also to be understood that the present disclosure covers all modifications, equivalents and alternatives falling within the spirit and scope of the disclosure as defined by the appended claims.

What is claimed is:

1. A wheel resonator assembly for reducing a resonance phenomenon inside a tire of a vehicle, comprising a plurality of wheel resonators mounted to a tire wheel,
   wherein first and second wheel resonators of the plurality of wheel resonators are fixed with each other by a fastening part including a protrusion disposed on an end of the first wheel resonator penetrating through a hole disposed in an end of the second wheel resonator,
   wherein an end portion of the protrusion has a size greater than a size of the hole,
   wherein each of the first and second wheel resonators includes first and second support portions each curvedly extending at opposite sides of the each of the first and second wheel resonators toward a support wall of a rim portion of the tire wheel,
   wherein each of the first and second support portions is formed with a hook portion at an opposite distal end thereof and the support wall of the rim portion is formed with first and second flange portions along an inner surface thereof,
   wherein the hook portion of the first support portion is configured to be assembled to the first flange portion of the rim portion of the tire wheel by forcing the hook portion of the first support portion to be coupled and supported by the first flange portion of the support wall at one side of the rim portion,
   wherein the hook portion of the second support portion, opposite to the first support portion supported by the first flange portion of the support wall, is spaced apart from the second flange portion of the support wall of the rim portion, and
   wherein the wheel resonator has a flat tube structure having a closed resonance chamber with a predetermined internal volume.

2. The wheel resonator assembly according to claim 1, wherein each of opposite ends of each of the plurality of wheel resonators includes a hole or a protrusion of the fastening part.

3. The wheel resonator assembly according to claim 1, wherein the second wheel resonator includes another hole disposed in another end of the second wheel resonator.

4. The wheel resonator assembly according to claim 3, wherein among the plurality of wheel resonators, the second wheel resonator is the only wheel resonator which has holes disposed in the both ends.

5. The wheel resonator assembly according to claim 1, wherein the first wheel resonator includes another protrusion disposed on another end of the first wheel resonator.

6. The wheel resonator assembly according to claim 5, wherein among the plurality of wheel resonators, the first wheel resonator is the only wheel resonator which has protrusions disposed on the both ends.

7. The wheel resonator assembly according to claim 1, wherein the first wheel resonator includes a hole disposed in another end of the first wheel resonator.

8. The wheel resonator assembly according to claim 1, wherein the second wheel resonator includes a protrusion disposed on another end of the second wheel resonator.

9. The wheel resonator assembly according to claim 1, wherein among the plurality of wheel resonators mounted to the tire wheel, two or more wheel resonators each have a protrusion disposed on one end and a hole disposed in another end.

10. The wheel resonator assembly according to claim 1, wherein each of the plurality of wheel resonators has an arc shape having a radius of curvature the same as that of an outer periphery of the rim portion of the tire wheel.

11. The wheel resonator assembly according to claim 10, wherein the plurality of wheel resonators are fastened to each other and form an annular structure wound around the rim portion of the tire wheel.

12. The wheel resonator assembly according to claim 11, wherein the rim portion of the tire wheel is mounted with four wheel resonators, the hook portion of the first support portion of the wheel resonators each having the resonance chamber contacts the first flange portion of the rim portion, and the hook portion of the second support portion of the wheel resonators each having the resonance chamber is spaced apart from the second flange portion of the rim portion.

13. The wheel resonator assembly according to claim 1, wherein the fastening part on either one side of the wheel resonator is provided as plural ones.

* * * * *